A. E. AYRES & J. J. DONLEY.
COOKING UTENSIL.
APPLICATION FILED MAR. 29, 1918.
1,288,799.
Patented Dec. 24, 1918.
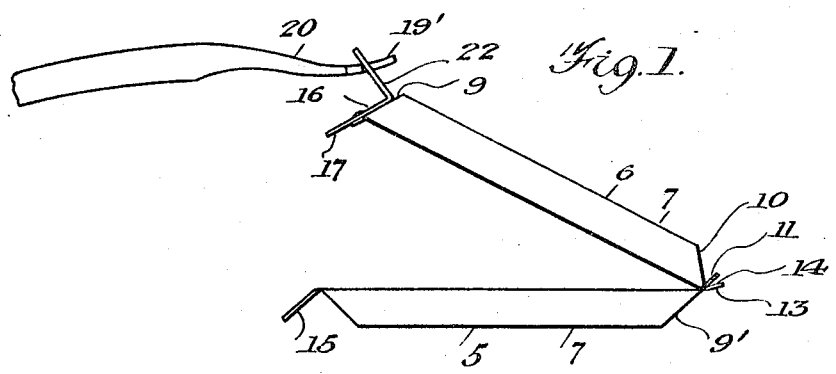
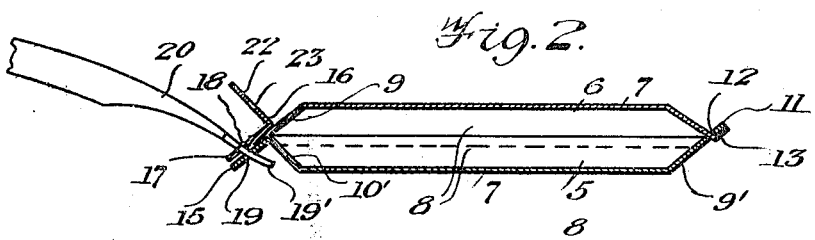
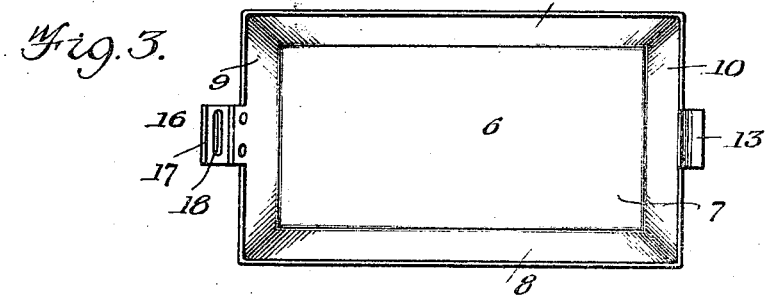
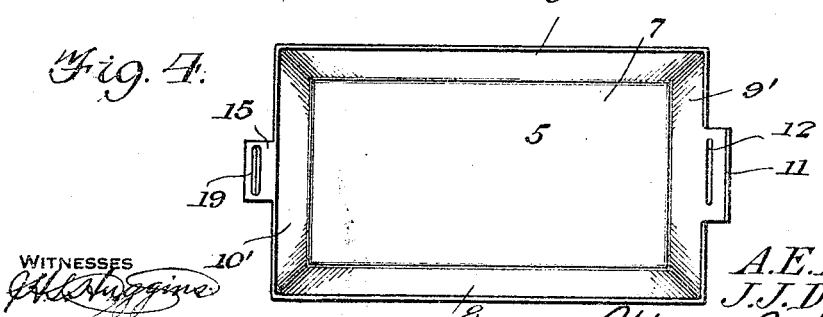
INVENTOR
A. E. Ayres
J. J. Donley

UNITED STATES PATENT OFFICE.

AMOS E. AYRES AND JOSEPH J. DONLEY, OF SALIDA, COLORADO.

COOKING UTENSIL.

1,288,799.

Specification of Letters Patent.   Patented Dec. 24, 1918.

Application filed March 29, 1918. Serial No. 225,549.

*To all whom it may concern:*

Be it known that we, AMOS E. AYRES and JOSEPH J. DONLEY, citizens of the United States, residing at Salida, in the county of Chaffee and State of Colorado, have invented new and useful Improvements in Cooking Utensils, of which the following is a specification.

This invention has reference to a cooking utensil primarily designed for use by campers, tourists, or such persons using an open fire, but the device may be adaptable for use as a baking pan on or in a stove.

The primary object of the present invention resides in the production of a cooking utensil embodying a pan consisting of a pair of sections, which, when assembled for use, will snugly fit together and assure against the admission of ashes and dirt within the pan, and at the same time prevent the escape of the strength of the food from said pan.

A still further object of the invention is the provision of a novel construction of hinge which affords the opening of the pan sections, and further the provision of lips provided on each of the sections adapting one or both of the sections to be lifted from the fire or stove as the occasion may so demand.

With the above and other objects in view, the invention consists in the novel features, details of construction and combination of parts which will hereinafter be more fully set forth, illustrated in the accompanying drawing and pointed out in the appended claim.

Figure 1 is a side elevation of the utensil in a partially open position.

Fig. 2 is a longitudinal sectional view of the utensil in closed position.

Figs. 3 and 4 are plan views of the pan.

Referring more particularly to the accompanying drawing, in which like characters of reference refer to corresponding parts in the several views, the sections forming the complete cooking utensil are designated by the characters 5 and 6 respectively. The sections are constructed of metal, copper or the like, of substantially rectangular form and embodying a bottom 7, oppositely flared side walls 8 and oppositely disposed flared end walls 9, 9', 10 and 10'. In order to establish a hinged connection of the section 6 with the pan section 5, when forming the complete pan, we provide on the upper longitudinal edge of the end wall 9' of the section 5 an extension 11 formed with an elongated slot 12 in which projects the angular tong 13 formed on the upper edge of the end wall 10 of the section 6, when the section 6 is inverted and placed over the section 5. Due to the specific formation of the tong 13, the face 14 thereof will serve as the fulcrum point for the section 6 by rocking on the lower wall forming the slot 12 in the extension 11. Provided on the end wall 10' of the pan section 5 is a projection 15, formed contiguous with the end wall at a point in longitudinal alinement with the extension 11, and this projection is bent in an outward and downward inclined position, or in other words, in diverging confronting relation with respect to the end wall 10'. The character 16 denotes a wing-shaped member secured exteriorly on the end wall 9 of the pan section 6 and in longitudinal alinement with the tong 13, providing the lip 17 in an upward and outward inclined direction, consequently, when the pan section 6 is converted to form a complete utensil, the slot 18 of the lip will register with the slot 19 of the projection 15, to permit of the head 19 of a suitable tool 20 to be inserted through the registering slots, whereby the complete pan may be slightly or completely lifted from the open fire when it is desired to remove the pan therefrom. The handle 22 of the wing-shaped member diverges in a downward and outward direction with respect to the end wall 9 and has a slot 23 formed therein, permitting of the head of the tool being inserted therein when desiring to swing the pan section 6 to an open position.

We desire to have it understood that the construction of a pan of this character permits of the same being knocked down and assembled in compact form, necessitating but a minimum amount of space in the storage and transportation of the same, due to the fact that the tong 13 may be projected through the elongated slot 12 of the extension 11, while the slot 23 of the handle 22 will register with the slot of the projection 15, and by the passing of a flexible strand or other tying element through the registering slots when the pans are in a knock-down form, will positively prevent the sections of the pan from being disassembled.

From the foregoing description, taken in connection with the accompanying drawing, the advantages of construction and the method of operation will be readily apparent to those skilled in the art to which the invention relates, and while we have described the principles of operation of the invention, together with the device which we now consider to be the best embodiment thereof, we desire to have it understood that the device shown is merely illustrative and that such changes may be made when desired as are within the scope of the appended claim.

What is claimed as new, is:—

The herein described cooking utensil comprising a pair of pan sections each provided with flared sides and end walls, a slotted extension formed on the end walls of one of said pan sections, a downwardly extending slotted projection formed on the opposite end wall of the latter mentioned pan section, a tong formed on one of the end walls of the other pan section and adapted to coöperate with the slotted extension when the pans are in a nested position and also when one pan is used as a cover for the other of said pans, and a slotted member provided on the opposite end wall of said second mentioned pan section with one slot thereof registering with the slot of the projection when the pan sections are either in a nested position or when one pan section is being utilized as a cover for the opposite pan section, the other slot of said member facilitating the insertion therein of a tool, substantially as and for the purposes specified.

In testimony whereof we affix our signatures.

AMOS E. AYRES.
JOSEPH J. DONLEY.

Copies of this patent may be obtained for five cents each, by addressing the "Commissioner of Patents, Washington, D. C."